(12) United States Patent
Tanaka et al.

(10) Patent No.: US 9,081,388 B2
(45) Date of Patent: Jul. 14, 2015

(54) FLOW RATE CONTROL DEVICE

(75) Inventors: Yuki Tanaka, Kyoto (JP); Toshihiro Kashima, Kyoto (JP)

(73) Assignee: HORIBA STEC, Co., Ltd., Kyoto-shi (JP)

( * ) Notice: Subject to any disclaimer, the term of this patent is extended or adjusted under 35 U.S.C. 154(b) by 501 days.

(21) Appl. No.: 12/861,536

(22) Filed: Aug. 23, 2010

(65) Prior Publication Data

US 2011/0048551 A1 Mar. 3, 2011

(30) Foreign Application Priority Data

Aug. 25, 2009 (JP) ................................ 2009-194811

(51) Int. Cl.
*G05D 7/06* (2006.01)
(52) U.S. Cl.
CPC .................................... *G05D 7/0635* (2013.01)
(58) Field of Classification Search
CPC .................................................. G05D 7/0635
USPC .................. 137/486, 487.5; 73/1.34
See application file for complete search history.

(56) References Cited

U.S. PATENT DOCUMENTS

| 5,983,700 | A * | 11/1999 | Yamaguchi et al. | ........... 73/1.34 |
| 6,655,408 | B2 * | 12/2003 | Linthorst | ................... 137/487.5 |
| 6,712,084 | B2 * | 3/2004 | Shajii et al. | ...................... 137/12 |

FOREIGN PATENT DOCUMENTS

| JP | 4208818 | A | 7/1992 |
| JP | 05138087 | | 6/1993 |
| JP | 07084649 | A | 3/1995 |
| JP | 09250649 | | 9/1997 |
| JP | 10300548 | | 11/1998 |
| JP | 2000020134 | | 1/2000 |
| JP | 2000020137 | A | 1/2000 |
| JP | 2003194648 | | 7/2003 |
| JP | 2004-280689 | | 10/2004 |
| JP | 2005258089 | A | 9/2005 |
| JP | 2005315712 | A | 11/2005 |
| JP | 2007017389 | A | 1/2007 |
| JP | 2007087029 | A | 4/2007 |
| JP | 2008129765 | A | 6/2008 |
| WO | 2005124492 | A1 | 12/2005 |
| WO | 2008041390 | A1 | 4/2008 |

* cited by examiner

*Primary Examiner* — William McCalister
(74) *Attorney, Agent, or Firm* — Alleman Hall McCoy Russell & Tuttle LLP (57) ABSTRACT

A mass flow controller comprises a flow rate measuring part that measures a flow rate of a fluid flowing in a flow channel and outputs a measured flow rate value, a control valve, a valve control part that controls an opening degree of the control valve based on an entirely-close command to entirely close the control valve compulsorily or a set flow rate value set as a target value, and an external output part that outputs an external output flow rate value based on the measured flow rate value to the outside, and at a time when the valve control part receives the entirely close command or zero as the set flow rate value, the external output part outputs zero as the external output flow rate value, irrespective of the measured flow rate value.

3 Claims, 10 Drawing Sheets

FLOW RATE CONTROL DEVICE

FIELD OF THE ART

This invention relates to a flow rate control device that can output a flow rate of a fluid flowing in a flow channel to the outside.

BACKGROUND ART

A mass flow controller as a kind of the flow rate control device measures a flow rate of a fluid flowing in a flow channel by the use of a flow rate sensor as shown in the patent document 1, and controls an opening degree of the fluid control valve so that a measured flow rate value of the fluid becomes a set flow rate value as being a target value. For this kind of the mass flow controller, an external output part such as an external output terminal is arranged to display the flow rate value of the fluid flowing in the flow channel by the use of a liquid crystal display while the flow rate is controlled or to make it possible for the other device to use the flow rate value. The external output part ordinarily displays the measured flow rate value output from the above-mentioned flow rate sensor as it is or the measured flow rate value with a minute fluctuation component removed, such as a noise component on the liquid crystal display.

Meanwhile, the mass flow controller is also used not only for controlling a flow rate so as to maintain a constant flow rate in a flow channel but also for making the flow channel have an entirely closed state wherein no fluid flows in the flow channel by setting the setting flow rate at zero.

Since the control valve is completely closed in the entirely closed state so that no fluid flows, it is ordinarily considered that the external output flow rate value output from the external output part is also considered to be zero.

However, if a pressure fluctuation is generated in the fluid on the upstream side where the flow rate sensor is arranged after the control valve is closed, a problem might occur in that the flow rate sensor outputs the measured flow rate value as if a fluid flows through the control valve and accordingly the external output part also outputs false information that the fluid flows in the control valve although no fluid actually flows on the downstream side of the control valve.

As mentioned, the following concrete problems are generated if the external output part outputs a value other than approximately zero although the control valve is actually completely closed and no fluid passes the control valve and no fluid flows on the downstream side of the control valve in the flow channel.

From a standpoint of a customer who actually uses the mass flow controller, the customer misunderstands if a fluid actually flows because it is so displayed as if the fluid flows and passes the control valve in spite of the entirely closed state by the use of the mass flow controller, or the customer mistakes that the mass flow controller is out of order although there is no problem in actual use.

From a standpoint of a manufacturer who conducts maintenance of the mass flow controller, in an entirely closed state it is difficult for the manufacturer to judge whether or not just a certain value is displayed as the external output flow rate value although there is no problem for the mass flow controller itself, or whether or not a value results from a problem such as drift or trouble with the flow rate sensor. In other words, it becomes difficult to use the external output flow rate value as the criteria for judging what maintenance is to be conducted.

PRIOR ART DOCUMENT

Patent Document

Patent Document 1
Japan patent laid-open number 2004-280689

DISCLOSURE OF THE INVENTION

Problems to be Solved by the Invention

The present claimed invention intends to solve at least some of the problems and an object of this invention is to provide a flow rate control device that can solve various problems resulting from a case in which an ordinarily incredible value is output as the external output flow rate value although no fluid passes and flows through the control valve by entirely closing the flow rate control device.

Means to Solve the Problems

More specifically, the flow rate control device of this invention comprises a flow rate sensor that measures a flow rate of a fluid flowing in a flow channel and outputs a measured flow rate value, a control valve, a valve control part that controls an opening degree of the control valve based on an entirely-close command to entirely close the control valve compulsorily or a set flow rate value set as a target value, and an external output part that outputs an external output flow rate value based on the measured flow rate value to the outside, and is characterized by that at a time when the valve control part receives the entirely-close command or zero as the set flow rate value, the external output part outputs zero as the external output flow rate value, irrespective of the measured flow rate value. "Output zero" indicates that there exists substantially no flow rate of the fluid.

In addition, a program for the flow rate control device of this invention is a program for the flow rate control device comprising a flow rate measuring part that measures a flow rate of a fluid flowing in a flow channel and outputs a measured flow rate value, a control valve a valve control part that controls an opening degree of the control valve based on an entirely-close command to entirely close the control valve compulsorily or a set flow rate value set as a target value, and an external output part that outputs an external output flow rate value based on the measured flow rate value to the outside, and for controlling the external output flow rate value output by the external output part, and is characterized by controlling the external output part to output zero as the external output flow rate value, irrespective of the measured flow rate value, at a time when the valve control part receives the entirely-close command or zero as the set flow rate value.

In accordance with this arrangement, since it is so arranged that the external output part outputs zero in a state in which the control valve is completely closed after the control valve is directed to be in the completely closed state by the valve control part as the external output flow rate value, irrespective of the measured flow rate value, even though the flow rate sensor outputs a value other than zero as the measured flow rate value due to a pressure fluctuation in a flow channel where the flow rate sensor is arranged although no fluid flows through the control valve, there is no chance of outputting measured flow rate value other than zero to the outside. As a result, it is possible to prevent a case in which a customer who actually uses the flow rate control device misunderstands that the flow rate control device is out of order or the flow rate control device is of low credibility at a time when the falsely external output flow rate value is output in the entirely closed state.

In addition, a flow rate control device of this invention comprises a flow rate sensor that measures a flow rate of a fluid flowing in a flow channel and outputs a measured flow rate value, a control valve, a valve control part that controls an opening degree of the control valve based on an entirely-close command to entirely close the control valve compulsorily or a set flow rate value set as a target value, and an external output part that outputs an external output flow rate value based on the measured flow rate value to the outside, and is characterized by that at a time when the valve control part receives the entirely-close command or zero as the set flow rate value, the external output part outputs the measured flow rate value at a certain point after the valve control part receives the entirely-close command or zero as the set flow rate value as the external output flow rate value, irrespective of the measured flow rate value.

Furthermore, a program for a flow rate control device of this invention is a program for the flow rate control device comprising a flow rate measuring part that measures a flow rate of a fluid flowing in a flow channel and outputs a measured flow rate value, a control valve, a valve control part that controls an opening degree of the control valve based on an entirely-close command to entirely close the control valve compulsorily or a set flow rate value set as a target value, and an external output part that outputs an external output flow rate value based on the measured flow rate value to the outside, and for controlling the external output flow rate value output by the external output part, and is characterized by controlling the external output part to output the measured flow rate value at a certain point after the valve control part receives the entirely-close command or zero as the set flow rate value as the external output flow rate value, irrespective of the measured flow rate value, at a time when the valve control part receives the entirely-close command or zero as the set flow rate value.

In accordance with this arrangement, since it is possible to continue to output a value at a certain time after the control valve is completely closed, only the measured flow rate value containing the drift in a state in which no fluid passes the control valve can be displayed as the external output flow rate value. With this arrangement, since it is possible to display the zero output of the flow rate sensor as the external output flow rate value in a state in which no fluid passes the control valve, the value can be the information for making a decision whether or not the flow rate sensor is out of order. In addition, "at a certain point" may be just after the entirely-close command is received, or after a certain period passes. After a certain period passes, since the valve is completely closed in fact, it is possible to output the measured flow rate value in a state in which no fluid passes and flows through the control valve, thereby enabling the external output flow rate value to display the flow rate that conforms much more to the actual condition.

Furthermore, a flow rate control device of this invention comprises a flow rate sensor that measures a flow rate of a fluid flowing in a flow channel and outputs a measured flow rate value, a control valve, a valve control part that controls an opening degree of the control valve based on an entirely-close command to entirely close the control valve compulsorily or a set flow rate value set as a target value, and an external output part that outputs an external output flow rate value based on the measured flow rate value to the outside, and is characterized by that in a case in which an absolute value of a time variation of the measured flow rate value becomes equal to or greater than a predetermined value after the valve control part receives the entirely-close command or zero as the set flow rate value, the external output part outputs the measured output flow rate value at the time when the absolute value becomes equal to or greater than the predetermined value as the external output flow rate value.

In addition, a program for a flow rate control device of this invention is a program for the flow rate control device comprising a flow rate measuring part that measures a flow rate of a fluid flowing in a flow channel and outputs a measured flow rate value, a control valve, a valve control part that controls an opening degree of the control valve based on an entirely-close command to entirely close the control valve compulsorily or a set flow rate value set as a target value, and an external output part that outputs an external output flow rate value based on the measured flow rate value to the outside, and for controlling the external output flow rate value output by the external output part, and is characterized by controlling the external output part to output the measured output flow rate value at a time when an absolute value of a time variation of the measured flow rate value becomes equal to or greater than a predetermined value as the external output flow rate value in a case in which the absolute value becomes equal to or greater than the predetermined value after the valve control part receives the entirely-close command or zero as the set flow rate value.

In accordance with this arrangement, after the control valve is completely closed, the time variation of the measured flow rate value becomes equal to or greater than the predetermined value, namely, in a case in which the measured flow rate rapidly changes, it is so arranged that the external output part outputs the measured flow rate value at the time as the external output flow rate value for a certain period. Then it is possible to output the measured flow rate value expressing the drift of the flow rate sensor at a stabilized time in the entirely closed state as the external output flow rate value without outputting the measured flow rate value falsely measured due to the pressure fluctuation. As a result, since it is possible not only to output the information to be the criteria for judgment for maintenance such as a failure or drift of the flow rate sensor but also to eliminate unnecessary false detection due to pressure fluctuation, the external output flow rate value can be preferably used for maintenance or the like.

Furthermore, a flow rate control device of this invention comprises a flow rate sensor that measures a flow rate of a fluid flowing in a flow channel and outputs a measured flow rate value, a control valve, a valve control part that controls an opening degree of the control valve based on an entirely-close command to entirely close the control valve compulsorily or a set flow rate value set as a target value, and an external output part that outputs an external output flow rate value based on the measured flow rate value to the outside, and further comprises a pressure measuring part that is arranged in the same side as that of the flow rate measuring part to the control valve and that measures a pressure in the flow channel and outputs the measured pressure value, and is characterized by that in a case in which an absolute value of a time variation of the measured pressure value becomes equal to or greater than a predetermined value after the valve control part receives the entirely-close command or zero as the set flow rate value, the external output part outputs the measured output flow rate value at the time when the absolute value becomes equal to or greater than the predetermined value as the external output flow rate value.

In addition, a program for a flow rate control device of this invention is a program for the flow rate control device comprising a flow rate measuring part that measures a flow rate of a fluid flowing in a flow channel and outputs a measured flow rate value, a control valve, a valve control part that controls an opening degree of the control valve based on an entirely-close command to entirely close the control valve compulsorily or a set flow rate value set as a target value, an external output part that outputs an external output flow rate value based on the measured flow rate value to the outside, and a pressure measuring part that is arranged in the same side as that of the flow rate measuring part to the control valve and that measures a pressure in the flow channel and outputs the measured pressure value, and for controlling the external output flow rate value output by the external output part, and is characterized by controlling the external output part to output the measured output flow rate value at a time when an absolute value of a time variation of the measured pressure value becomes equal to or greater than a predetermined value as the external output flow rate value in a case in which the absolute value becomes equal to or greater than the predetermined value after the valve control part receives the entirely-close command or zero as the set flow rate value.

In accordance with this arrangement, since the pressure sensor is arranged on the upstream side of the flow rate control valve, it is possible to directly measure the fluctuation of the pressure that will be a cause of false detection of the flow rate for the flow rate sensor in a state in which the flow rate control device is in the entirely closed state wherein no fluid flows. In a case in which there is a pressure fluctuation, since it is so arranged that the measured flow rate value at a time when the pressure fluctuation occurs is output as the external output flow rate value for a certain period, it is possible to prevent a case in which the falsely detected measured flow rate value is output to the outside. In addition, since the measured flow rate value at a stable time is output as the external output value for a certain period, it is possible to output the value resulting from the drift or malfunction of the flow rate sensor so that the value can be used as the information for making a decision for maintenance or the like.

In order to make it possible for the flow rate sensor to output the external output flow rate value from which obvious false detection alone is eliminated by using the constantly updated measured flow rate value as much as possible, it is represented that the external output part outputs the measured flow rate value measured by the flow rate measuring part as the external output flow rate value, in a case in which the time variation of the measured pressure value is generally zero after the valve control part receives the entirely-close command or zero as the set flow rate value.

Effect of the Invention

As mentioned, in accordance with this invention, since it is so arranged that zero is displayed as the external output flow rate value on a constant basis in a case in which the control valve is entirely closed, or since the measured flow rate value at a time when a rapid change of the measured flow rate value is detected is used as the external output flow rate value for a certain period after the rapid change of the measured flow rate value is detected, it is possible to prevent a case in which false information as if the fluid flows is output as the external output flow rate value in spite of no fluid flowing in the flow channel. As a result, it is possible to prevent a case in which a user of the flow rate control device misunderstands that the flow rate control device is out of order, or to make it possible for a person who conducts maintenance to use the external output flow rate value as one of the criteria for judgment.

BEST MODES OF EMBODYING THE INVENTION

A first embodiment of this invention will be explained with reference to the drawings.

Figure 1:
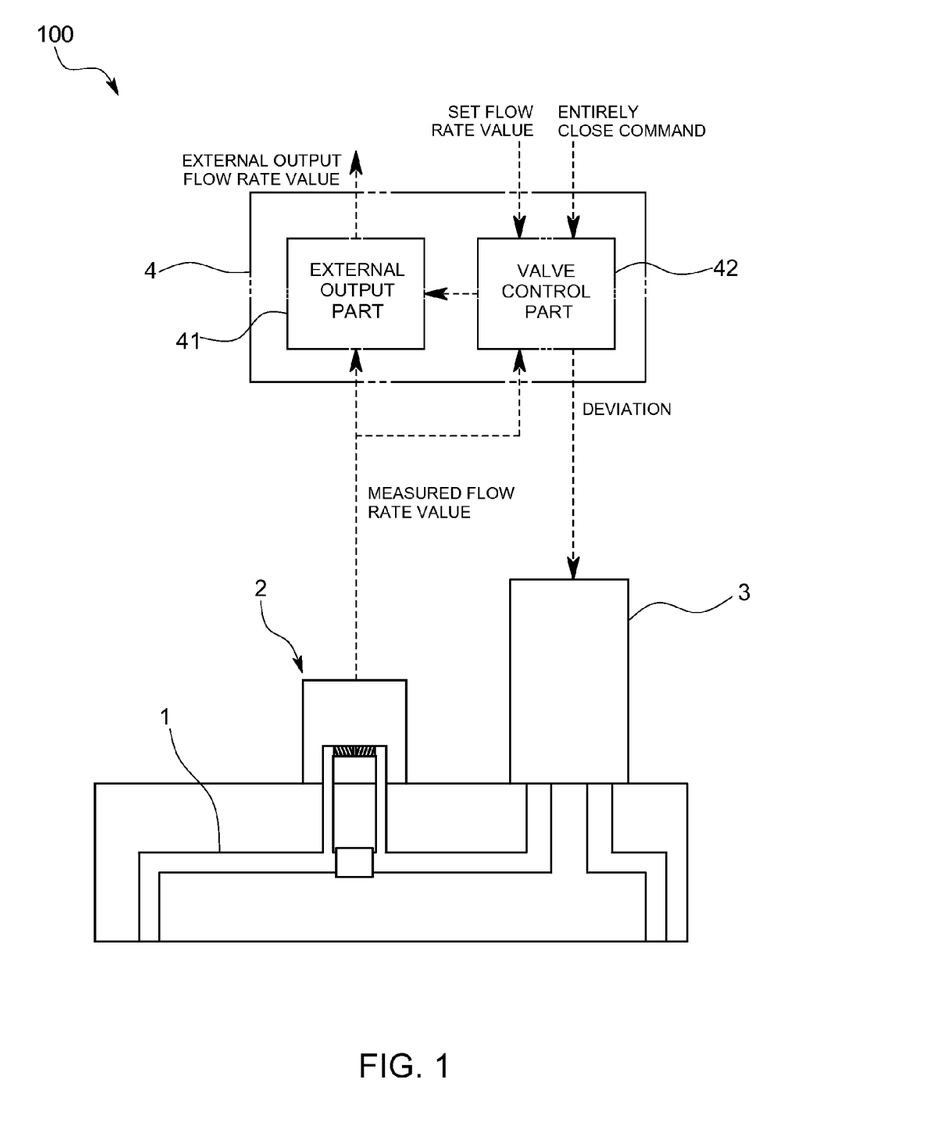
FIG. 1 is a pattern diagram of a flow rate control device in accordance with a first embodiment of this invention.

A mass flow controller 100 as being a kind of a flow rate control device in accordance with the first embodiment of this invention comprises, as shown in FIG. 1, a flow channel 1 comprising a groove formed inside of a body of a block shape, a flow rate sensor 2 to measure a flow rate of a fluid flowing in the flow channel 1, a control valve 3 arranged on the downstream side of the flow rate sensor 2, and a control part 4 that at least controls an opening degree of the control valve 3 and displays and outputs the flow rate of the fluid currently flowing in the flow channel 1 to the outside.

In a process of manufacturing, for example, semiconductors, this mass flow controller 100 is used for controlling a flow rate of each component gas or a dilution gas. The mass flow controller 100 is also used for ceasing the fluid flowing in the flow channel 1 completely by entirely closing the control valve 3.

Each part will be explained with reference to FIG. 1.

The flow rate sensor 2 is a thermal type flow rate sensor 2 and provided with two coils arranged in small-diameter pipes arranged in parallel to the flow channel 1. The flow rate sensor 2 applies voltage to two coils and controls the voltage so that the temperature of each coil becomes the same and constant value, and a flow rate calculating part, not shown in the drawings, calculates a mass flow rate of the fluid flowing in the flow channel 1 based on each voltage applied at the time when the voltage is controlled. A combination of the flow rate sensor 2 and the flow rate calculating part corresponds to a flow rate measuring part described in the claims.

The control valve 3 is of, for example, a solenoid-controlled type and is so arranged as to move a valve body relative to a valve sheet, not shown in drawings, by the use of an electromagnet so as to control a valve opening degree.

The control part 4 is so called a computer having a CPU, a memory, an AC/DC converter, an input terminal, an external output display and an external output mechanism, and produces functions as a valve control part 42 and an external output part 41 by executing each program stored in the memory by the CPU. As shown in a control block diagram, it is so arranged that a measured flow rate value by the flow rate sensor 2 is supplied to the valve control part 42 and the external output part 41, and the flow rate is controlled by the use of the measured flow rate value. In addition, an external output flow rate value output by the external output part 41 is not input to the valve control part 42 so that it is not used for controlling the flow rate.

The control part 4 is not limited to the control part arranged on the mass flow controller 100, and its function may be produced by a computer arranged on other film forming systems for manufacturing semiconductors or other multipurpose computers or the like.

The valve control part 42 is so arranged as to control an opening degree of the control valve 3 based on an entirely-close command to compulsorily close the control valve 3 entirely or to a set flow rate value set as a target value. The entirely-close command is a command to compulsorily close the control valve 3, irrespective of the measured flow rate value output by the flow rate sensor 2. So-called feedback control to control the valve opening degree is conducted to lessen a deviation between a desired set flow rate value and the measured flow rate value during a period of an ordinary flow rate control. In other words, it is also possible to control the control valve 3 to be closed by setting the set flow rate value at zero.

The external output part 41 displays the flow rate of the fluid currently flowing in the flow channel 1 on an LCD as an external output display arranged on, for example, a case of the mass flow controller 100, or outputs the external output flow rate value based on the measured flow rate value measured by the flow rate sensor 2 to other equipment. During the period of the ordinary flow rate control, it is so arranged that a minute variable component such as noise of the measured flow rate value is cut and then the measured flow rate value whose minute variable component is cut is output as the external output flow rate value. In the first embodiment, at a time of the entirely closed state as being a time when a predetermined period passes after the valve control part 42 receives the entirely-close command or zero as the set flow rate value, it is so arranged that zero is displayed as the external output flow rate value on a constant basis irrespective of the measured flow rate value measured after the time. The time when the predetermined period passes is a concept containing the time after zero second passes.

Figure 2:
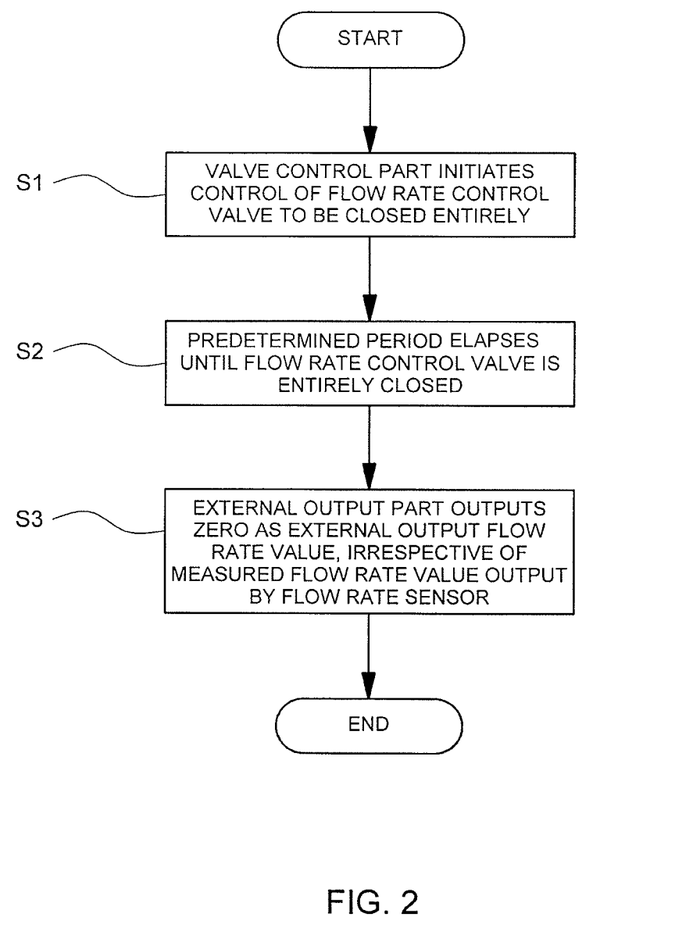
FIG. 2 is a flow chart regarding a display of an external output flow rate value at a time when a control valve is entirely closed in accordance with the first embodiment.
Figure 3:
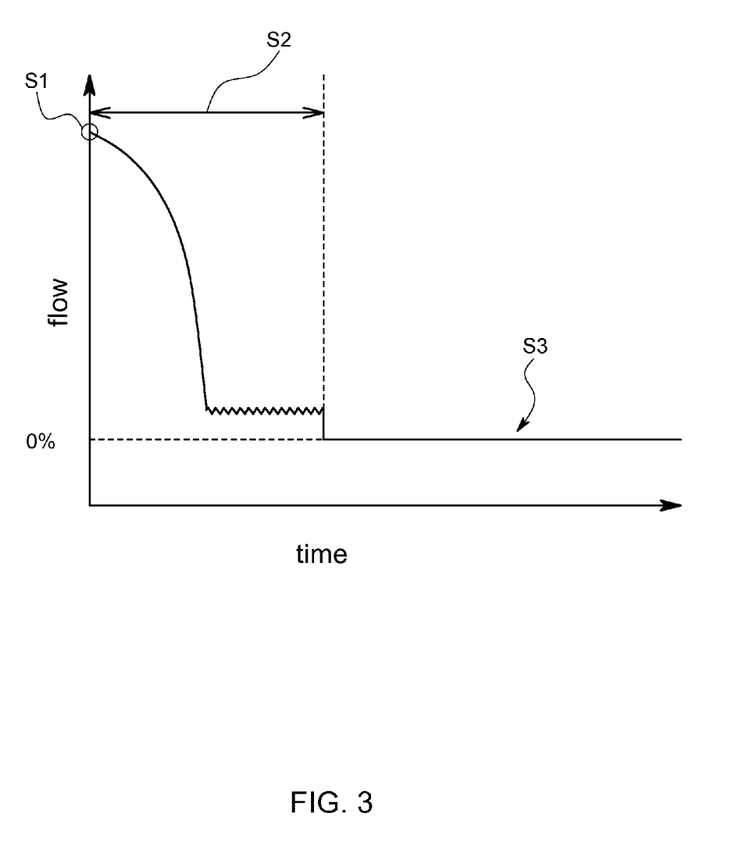
FIG. 3 is a graph showing a change of the external output flow rate value at a time when the control valve is entirely closed in accordance with the first embodiment.

A behavior of the mass flow controller 100 having the above-mentioned arrangement in the entirely closed state will be explained with reference to a flow chart shown in FIG. 2 and a graph shown in FIG. 3. A flow rate shown in FIG. 3 is the external output flow rate value.

First, the valve control part 42 receives the entirely-close command, or the set flow rate value is set at zero (step S1). At this time, since the opening degree of the control valve 3 becomes smaller, the external output flow rate value gradually approaches zero as shown in FIG. 3. Then it becomes in the entirely closed state wherein the control valve 3 is completely closed and a predetermined period elapses until the flow rate of the fluid flowing in the flow channel 1 is stabilized around zero (step S2). At a time when it is detected that the predetermined period passes, the external output part 41 displays zero as the external output flow rate value, irrespective of the currently measured flow rate value (step S3).

With this arrangement, it is possible for the external output part 41 to output zero as the external output flow rate value even though a certain value is output as the measured flow rate value because the flow rate sensor 2 falsely detects that the fluid is flowing due to pressure fluctuation on an upstream side of the control valve 3 irrespective of no fluid flowing in the entirely closed state.

In accordance with the mass flow controller 100 of the first embodiment, it is possible to preferably prevent a case in which a user misunderstands that the mass flow controller 100 is out of order or the mass flow controller 100 is of low credibility in spite of that there is no problem for the mass flow controller 100. In addition, since this arrangement just sets the external output flow rate value at zero and the external output flow rate value is not used for controlling the flow rate of the mass flow controller 100, there is no chance of producing a negative influence on the control for maintaining the entirely closed state.

Next, a mass flow controller 100 in accordance with a second embodiment of this invention will be explained. The same parts as those in the first embodiment are denoted by the same reference numerals as those in the first embodiment.

In the second embodiment, after a predetermined period passes from a time when the valve control part 42 receives the entirely-close command or zero as the set flow rate value, the external output part 41 is so arranged as to output the measured flow rate value measured at the time after the predetermined period passes as the external output flow rate value, irrespective of the currently measured flow rate value.

Figure 4:
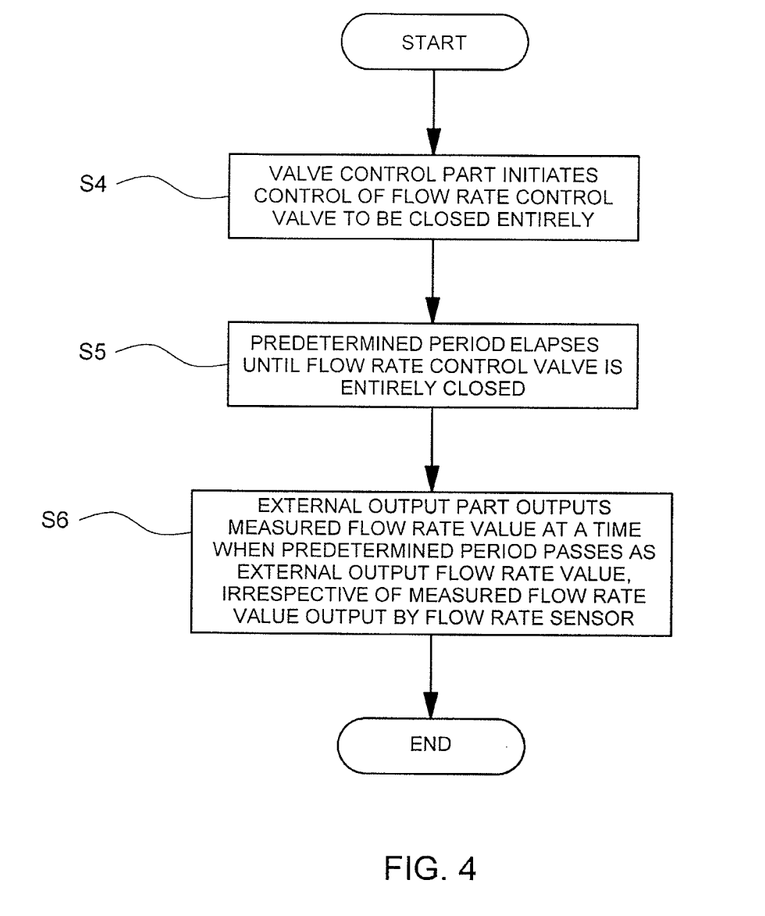
FIG. 4 is a flow chart regarding a display of an external output flow rate value of a flow rate control device in accordance with a second embodiment at a time when a control valve is entirely closed.

A behavior of the mass flow controller 100 of the second embodiment in the entirely closed state will be explained with reference to a flow chart in FIG. 4 and a graph shown in FIG. 5.

First, the valve control part 42 receives the entirely-close command, or the set flow rate value is set at zero (step S4). At this time, since the opening degree of the control valve 3 becomes smaller, the external output flow rate value gradually approaches zero as shown in FIG. 5. Then it becomes in the entirely closed state wherein the control valve 3 is completely closed and a predetermined period elapses until the flow rate of the fluid flowing in the flow channel 1 is stabilized around zero (step S5). At a time when it is detected that the predetermined period passes, the external output part 41 continues to display the measured flow rate value measured at the time after the predetermined period passes as the external output flow rate value, irrespective of the currently measured flow rate value (step S6).

As mentioned, in accordance with the mass flow controller 100 of the second embodiment, it is possible to output the measured flow rate value measured at a time just prior to false detection as the external output flow rate value even though a certain value is output as the measured flow rate value because the flow rate sensor 2 falsely detects that the fluid is flowing due to pressure fluctuation on an upstream side of the control valve 3, irrespective of no fluid flowing in the entirely closed state.

Figure 5:
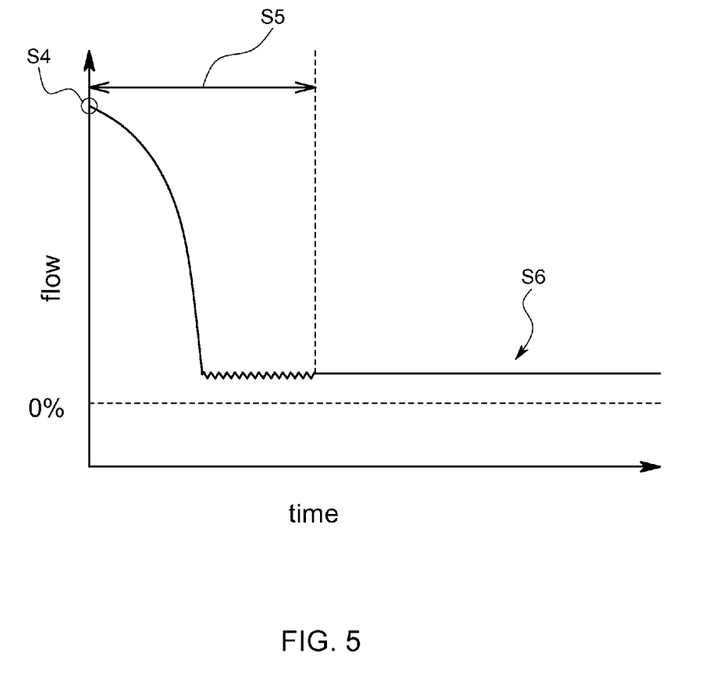
FIG. 5 is a graph showing a change of the external output flow rate value at a time when the control valve is entirely closed in accordance with the second embodiment.

As shown in the graph in FIG. 5, in a case in which, for example, a drift component of the flow rate sensor 2 appears in the measured flow rate value, a value of the drift component appears on the external output flow rate value stably. Then in a case in which maintenance or the like is conducted by, for example, a manufacturer, it is possible to use the external output flow rate value as the criteria for judgment because the flow rate value at a time of false detection will not appear.

Next, a mass flow controller 100 in accordance with a third embodiment of this invention will be explained.

In the third embodiment, at a time when an absolute value of a time derivative value of the measured flow rate value becomes equal to or greater than a predetermined value after the predetermined period passes from a time when the valve control part 42 receives the entirely-close command or zero as the set flow rate value, the external output part 41 is so arranged as to continue to output the measured flow rate value measured at the time when the absolute value of the time derivative value of the measured flow rate value becomes equal to the predetermined value as the external output flow rate value. The time derivative value corresponds to the time variation in claims.

Figure 6:
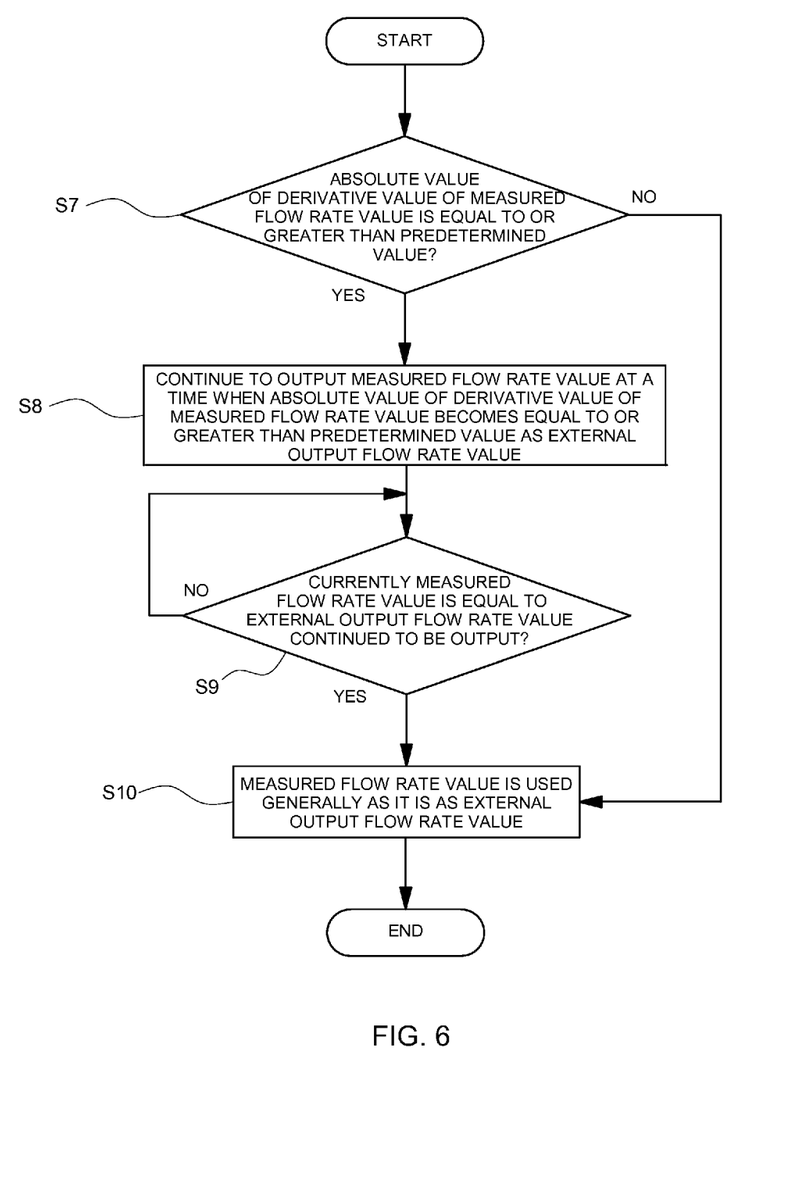
FIG. 6 is a flow chart regarding a display of an external output flow rate value of a flow rate control device in accordance with a third embodiment at a time when a control valve is entirely closed.

A behavior of the third embodiment after the predetermined period passes from a time when the valve control part 42 initiates control so as to be in the entirely closed state will be explained with reference to a flow chart shown in FIG. 6 and a graph shown in FIG. 7.

At a time when the external output part 41 detects that the absolute value of the time derivative value of the measured flow rate value becomes equal to or greater than the predetermined value (step S7), the external output part 41 keeps the measured flow rate value at this time. Subsequently the external output part 41 continues to output the kept measured flow rate value as the external output flow rate value until the measured flow rate value newly output by the flow rate sensor 2 becomes a value that is the same as the kept measured flow rate value (step S8). At a time when the measured flow rate value whose value is the same as the kept value is output by the flow rate sensor 2 (step S9), subsequently the external output part 41 is switched to continue to output the measured flow rate value as it is as the external output flow rate value again (step S10).

Figure 7:
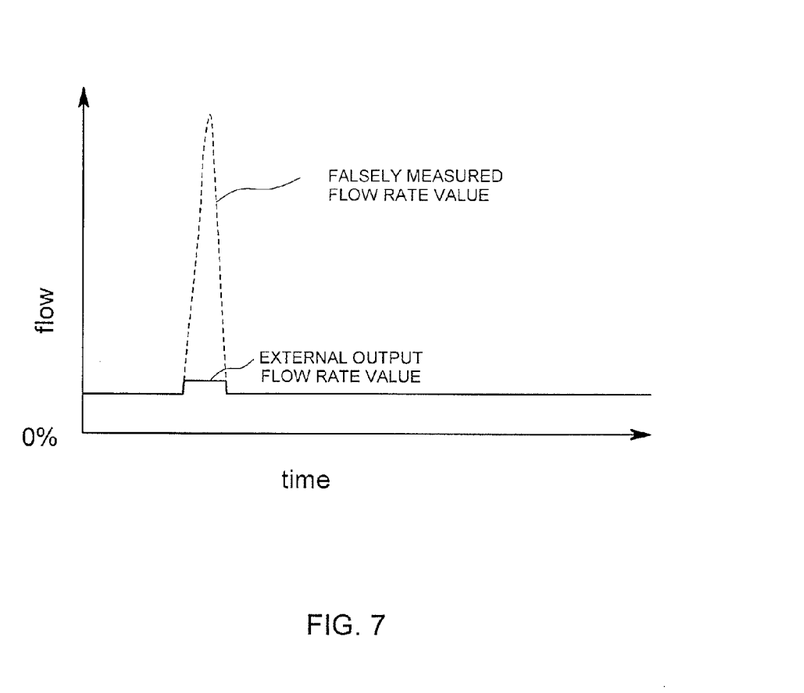
FIG. 7 is a graph showing a change of the external output flow rate value at a time when the control valve is entirely closed in accordance with the third embodiment.

As a result, as shown in a graph in FIG. 7, if a false value having an impulse waveform is output as an actual measured flow rate value, since the measured flow rate value measured at a time when the false value is output is continued to be output as the external output flow rate value for a while starting from the time when the measured flow rate value begins to rise and then the measured flow rate value is again used as it is as the external output flow rate value, it becomes clear that a projecting part having a trapezium shape is formed.

In accordance with the mass flow controller 100 of the third embodiment having the above-mentioned arrangement, in the entirely closed state, it is possible to prevent only a part that is falsely detected as there exists a flow rate due to pressure fluctuation from being output as the external output flow rate value, and it is possible to output the other normal part as it is as the external output flow rate value. In other words, since a falsely detected part can be eliminated by reflecting the currently measured output flow rate value in the external output flow rate value as much as possible, it is possible to further improve reliability of the external output flow rate value and to preferably detect also a drift of the flow rate sensor 2 similar to the second embodiment. As a result, it is possible to preferably use the mass flow controller 100 as an index for maintenance or the like.

Figure 8:
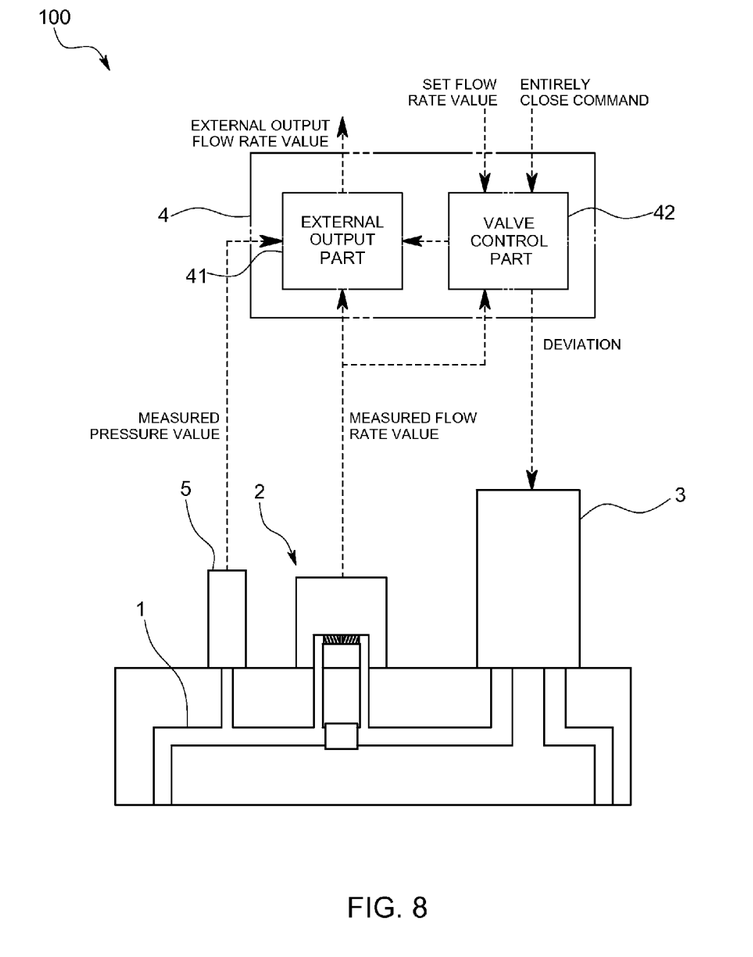
FIG. 8 is a pattern diagram of a flow rate control device in accordance with a fourth embodiment of this invention.

Next, a mass flow controller 100 in accordance with a fourth embodiment of this invention will be explained. In the fourth embodiment, as shown in FIG. 8, a pressure sensor 5 that measures a pressure in the flow channel 1 and outputs a measured pressure value is further provided on the upstream side of the control valve 3 in addition to the mass flow controller 100 of the first through third embodiment.

It is so arranged that the measured pressure value of the pressure sensor 5 is input to the external output part 41 and used for determining an output mode of the external output flow rate value in the entirely closed state. More specifically, at a time when an absolute value of a time derivative value of the measured pressure value becomes equal to or greater than a predetermined value after the predetermined period passes from a time when the valve control part 42 receives the entirely-close command or zero as the set flow rate value, it is so arranged that the external output part 41 continues to output the measured flow rate value measured at the time as the external output flow rate value.

Figure 9:
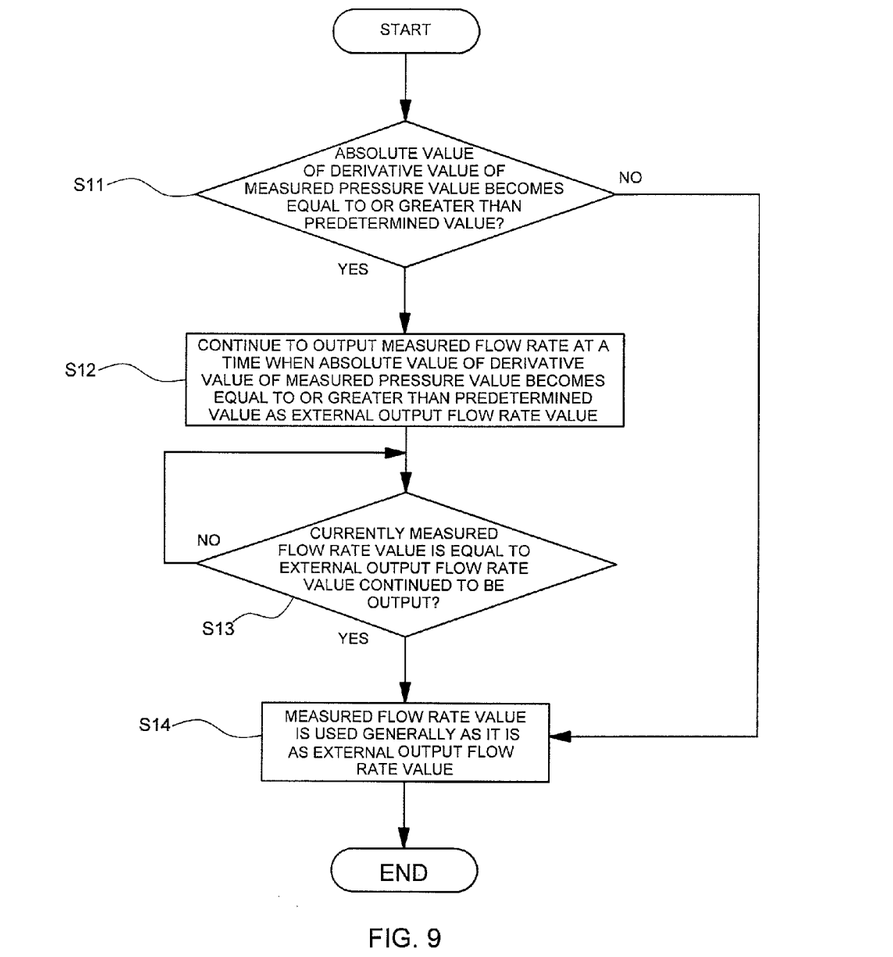
FIG. 9 is a flow chart regarding a display of an external output flow rate value at a time when a control valve is entirely closed in accordance with the fourth embodiment.

A behavior of the fourth embodiment after the predetermined period passes from a time when the valve control part 42 initiates control so as to be in the entirely closed state will be explained with reference to a flow chart shown in FIG. 9 and a graph shown in FIG. 10.

At a time when the external output part 41 detects that the absolute value of the time derivative value of the measured pressure value becomes equal to or greater than the predetermined value (step S11), the external output part 41 keeps the measured flow rate value measured at this time. Subsequently the external output part 41 continues to output the kept measured flow rate value as the external output flow rate value until the measured flow rate value newly output by the flow rate sensor 2 becomes a value that is the same as the kept measured flow rate value (step S12). At a time when the measured flow rate value whose value is the same as the kept value is output by the flow rate sensor 2 (step S13), subsequently the external output part 41 is switched to continue to output the measured flow rate value as it is as the external output flow rate value again (step S14).

Figure 10:
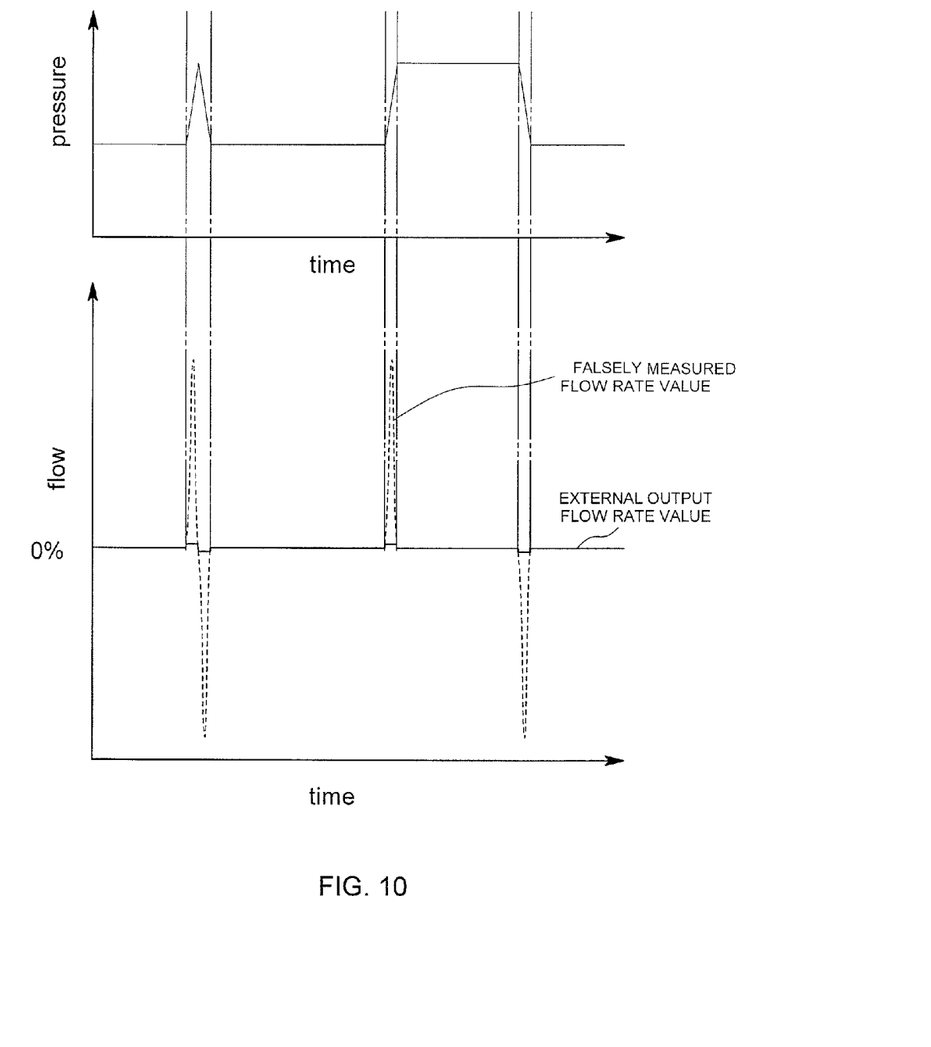
FIG. 10 is a graph showing a relationship between a measured pressure value and the external output flow rate value at a time when the control valve is entirely closed in accordance with the fourth embodiment.

As a result, as shown in a graph in FIG. 10, at a portion where the pressure fluctuates (at a portion having a tilt), the measured flow rate value measured at a time just before fluctuation begins is kept so as to be a constant value. In other words, if a false value having an impulse waveform is output as the actual measured flow rate value, since the measured flow rate value measured at a time when the false value is output is continued to be output as the external output flow rate value for a while starting from a time when the measured flow rate value begins to rise and then the measured flow rate value is again used as it is, it becomes clear that a projecting part having a trapezium shape is formed.

In accordance with the mass flow controller 100 of the fourth embodiment having the above-mentioned arrangement, it is possible to measure a pressure fluctuation that will be a cause of a false measured flow rate value in the entirely closed state and to display only a value measured at a stable time as the external output flow rate value based on the pressure fluctuation. As a result, it is possible to prevent a false value from being displayed as the external output flow rate value with high accuracy so that the mass flow controller 100 can be used as an index for maintenance or the like preferably with high accuracy.

Other embodiments will be explained.

In the above-mentioned embodiments, the flow rate sensor is a thermal type, however, the flow rate sensor may be of another type such as a differential type. The control valve is not limited to a solenoid type, and may be of another type such as a piezoelectric type.

In the above-mentioned embodiments, the control valve is arranged on the downstream side of the flow rate sensor, the measured flow rate value is falsely detected in a state in which the control valve is completely closed due to the pressure fluctuation on the upstream side of the control valve, namely, in the flow channel located in a side where the flow rate sensor is arranged although there is no fluid flowing in the control valve and the falsely detected measured flow rate value is prevented from being output as the external output. However, it is not limited to this arrangement and this invention can be applied also to a mass flow controller wherein a control valve is arranged on the upstream side of the flow rate sensor. Specifically, similar to the above-mentioned embodiment, it is possible to prevent various problems generated because the measured flow rate value is detected due to pressure fluctuation generated in a subsequent process on the downstream side of the control valve although there is no fluid flowing the control valve and the falsely detected measured flow rate value is output as it is as the external output flow rate value.

Furthermore, in a case in which a pressure sensor is further provided like the fourth embodiment and the external output flow rate value in a state in which the control valve is entirely closed is determined based on the pressure measured by the pressure sensor, the pressure sensor may be arranged in the flow channel on the same side as that of the flow rate sensor to the control valve. In other words, in a case in which the flow rate sensor is arranged on the upstream side of the control valve, the pressure sensor is arranged on the upstream side of the control valve. In a case in which the flow sensor is arranged on the downstream side of the control valve, the pressure sensor is arranged on the downstream side of the control valve.

In the above-mentioned embodiment, whether or not a predetermined period passes after the entirely-close command is received or the set flow rate value is set at zero is one of the criteria for judgment to set the external output value in the entirely closed state, however, the criteria for judgment may not necessarily depend on time. For example, one of the criteria for judgment may be whether or not the measured flow rate value output by the flow rate sensor is within several % around zero. Furthermore, the external output flow rate value of the external output part may be switched from an ordinary measured flow rate value in a case in which a time derivative value of the measured flow rate value becomes a predetermined value together with the above-mentioned criteria for judgment. In addition, an ordinary external output may be changed to another display mode depending on only whether or not the time derivative value of the measured flow rate reaches a predetermined value.

In addition, also in a case in which the pressure sensor is arranged and a value output as the external output flow rate value is switched based on the measured pressure value, whether or not the predetermined period passes may not be used as the criteria for judgment. For example, whether or not there is no pressure fluctuation may be verified by checking whether a derivative value of a pressure is generally smaller than a predetermined value and does not fluctuate much and the measured flow rate value at a time when the pressure fluctuation having an impulse waveform is detected may be output as the external output flow rate value.

In a case in which the entirely-close command is released or a value other than zero is set as the set flow rate value after a value other than the actually measured flow rate value is displayed as the external output flow rate value in the state in which the control valve is entirely closed, it may be so arranged that the currently measured flow rate value is output as the external output flow rate value again. With this arrangement, it is possible to switch the external output from the entirely closed state to another state very easily.

The mass flow controller is used as an example of the flow rate control device in each of the above-mentioned embodiments, however, the flow rate control device such as the mass flow controller is not limited to an arrangement as one package. For example, a control valve and a flow rate sensor may be prepared individually and it is possible to apply this invention to a flow rate control device that controls the control valve and the flow rate sensor by the use of a general purpose computer or the like.

In the third embodiment or the fourth embodiment, the time derivative value is used as the time variation, however, other variations may be used. For example, a variation of the measured flow rate value or the measured pressure value may be captured based on a moving average of the measured flow rate value or the measured pressure value, or simply difference may be captured. In addition, in the third embodiment and the fourth embodiment, in a case in which it is judged to display a value different from the ordinary measured flow rate value as the external output flow rate value, it is so arranged that a value measured just prior to this case is kept and the value is continued to be output, however, zero may be compulsorily displayed irrespective of the measured flow rate value.

In addition, each embodiment may be combined or modified without departing from the spirit of the invention.

Possible Applications in Industry

As mentioned, in accordance with this invention, since it is so arranged that zero is displayed as the external output flow rate value on a constant basis in a case in which the control valve is entirely closed, or since the measured flow rate value measured at a time when a rapid change of the measured flow rate value is detected is used as the external output flow rate value for a certain period after the rapid change of the measured flow rate value is detected, it is possible to prevent a case in which false information indicating that the fluid flows is output as the external output flow rate value in spite of no fluid flowing in the flow channel.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

EXPLANATION OF REFERENCE CHARACTERS

100 . . . mass flow controller (flow rate control device)
1 . . . flow channel
2 . . . flow rate sensor (flow rate measuring part)
3 . . . control valve
4 . . . control part
41 . . . external output part
42 . . . valve control part
5 . . . pressure sensor (pressure measuring part)

The invention claimed is:

1. A flow rate control device comprising a flow rate measuring part that measures a flow rate of a fluid flowing in a flow channel and outputs a measured flow rate value, a control valve, a valve control part that controls an opening degree of the control valve based on an entirely-close command to entirely close the control valve compulsorily or a set flow rate value set as a target value, and an external output part that, in a first mode of operation, outputs an external output flow rate value based on the measured flow rate value to a location outside of the flow rate control device, wherein in a second mode of operation,
the valve control part is configured to receive the entirely-close command or zero as the set flow rate value, the flow rate measuring part is configured to measure a non-zero value as the measured flow rate value, after receipt of the entirely-close command or zero as the set flow rate value, the external output part is configured to detect that an absolute value of a variation of the measured flow rate value with respect to time is equal to or greater than a predetermined value, and the external output part is configured to output the measured flow rate value only at the time when the absolute value is equal to or greater than the predetermined value as the external output flow rate value.

2. A flow rate control device comprising a flow rate measuring part that measures a flow rate of a fluid flowing in a flow channel and outputs a measured flow rate value, a control valve, a valve control part that controls an opening degree of the control valve based on an entirely-close command to entirely close the control valve compulsorily or a set flow rate value set as a target value, and an external output part that, in a first mode of operation, outputs an external output flow rate value based on the measured flow rate value to a location outside of the flow rate control device, further comprising a pressure measuring part that is arranged on a same side as that of the flow rate measuring part to the control valve and that measures a pressure in the flow channel and outputs a measured pressure value, wherein in a second mode of operation, the valve control part is configured to receive the entirely-close command or zero as the set flow rate value, the flow rate measuring part is configured to measure a non-zero value as the measured flow rate value, upon receipt of the entirely-close command or zero as the set flow rate value, the external output part is configured to detect that an absolute value of a variation of the measured pressure value with respect to time is equal to or greater than a predetermined value, and the external output part is configured to output a measured flow rate value only at the time when the absolute value is equal to or greater than the predetermined value as the external output flow rate value.

3. The flow rate control device described in claim 2, wherein in a third mode of operation, in a case in which the variation of the measured pressure value with respect to time is zero or less than a predetermined threshold fluctuation after the valve control part receives the entirely-close command or zero as the set flow rate value, the external output part outputs the measured flow rate value measured by the flow rate measuring part as the external output flow rate value.

* * * * *